(12) United States Patent
Huang et al.

(10) Patent No.: US 12,429,159 B2
(45) Date of Patent: Sep. 30, 2025

(54) WATERWAY TRANSFERRING DEVICE AND WATER PURIFICATION FAUCET

(71) Applicant: Xiamen Lota International Co., Ltd., Fujian (CN)

(72) Inventors: Qiang Huang, Fujian (CN); Yanyan Wang, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 185 days.

(21) Appl. No.: 17/874,193

(22) Filed: Jul. 26, 2022

(65) Prior Publication Data
US 2024/0035606 A1 Feb. 1, 2024

(51) Int. Cl.
*F16L 41/02* (2006.01)
*E03C 1/04* (2006.01)
*F16L 39/00* (2006.01)

(52) U.S. Cl.
CPC .......... *F16L 41/023* (2013.01); *E03C 1/0403* (2013.01); *F16L 39/005* (2013.01); *E03C 2201/40* (2013.01)

(58) Field of Classification Search
CPC ..... F16L 41/023; F16L 37/252; F16L 37/248; F16L 39/005; F16L 19/005; E03C 2201/40; E03C 1/0403; E03C 1/0405; E03C 1/0404; E03C 2001/0415; E03C 2001/026
See application file for complete search history.

(56) References Cited

U.S. PATENT DOCUMENTS

| | | | | |
|---|---|---|---|---|
| 236,519 | A * | 1/1881 | Walsh | F16L 39/02 285/356 |
| 3,980,112 | A * | 9/1976 | Basham | B67D 7/54 285/123.1 |
| 3,986,732 | A * | 10/1976 | Stanley | B67D 7/0478 285/190 |

(Continued)

FOREIGN PATENT DOCUMENTS

| CN | 213808987 U | 7/2021 | | |
|---|---|---|---|---|
| CN | 216382681 U | 4/2022 | | |
| DE | 19849362 A1 * | 5/2000 | | F24D 17/0084 |

OTHER PUBLICATIONS

Translation of DE-19849362-A1 (Year: 2000).*

*Primary Examiner* — Zachary T Dragicevich
*Assistant Examiner* — Alexander T Rufrano
(74) *Attorney, Agent, or Firm* — Cooper Legal Group, LLC

(57) ABSTRACT

A waterway transferring device comprises a transferring body, a water outlet joint, and an anti-releasing mechanism. The transferring body comprises a first water inlet passage, a second water inlet passage, and a water outlet passage. The water outlet joint comprises an outer joint and an inner joint extending in the outer joint and connected to the first water inlet passage. The anti-releasing mechanism comprises a first anti-releasing member and a second anti-releasing member. When the outer joint is rotated to be connected to the water outlet passage, the first anti-releasing member and the second anti-releasing member are rotated relative to each other to be connected together, and when the outer joint is rotated reversely, the first anti-releasing member and the second anti-releasing member abut each other in an opposite direction to inhibit a rotation of the outer joint.

16 Claims, 9 Drawing Sheets

(56) References Cited

U.S. PATENT DOCUMENTS

| | | | | |
|---|---|---|---|---|
| 5,259,651 | A | * | 11/1993 | Sharp .................... F16L 39/005 285/123.1 |
| 5,362,110 | A | * | 11/1994 | Bynum ................. F16L 19/005 411/326 |
| 5,388,866 | A | * | 2/1995 | Schlosser ............. F16L 19/005 285/94 |
| 5,635,058 | A | * | 6/1997 | Bowman .............. B01D 61/081 138/120 |
| 7,571,937 | B2 | * | 8/2009 | Patel ................... F16L 19/0225 285/386 |
| 9,890,889 | B2 | * | 2/2018 | Lechner .................. F16L 25/01 |
| 2020/0326025 | A1 | * | 10/2020 | Malouin ............... F16L 41/021 |
| 2022/0145601 | A1 | * | 5/2022 | Mcalpine .................. C02F 1/78 |
| 2023/0132961 | A1 | | 5/2023 | Zhou et al. |

* cited by examiner

WATERWAY TRANSFERRING DEVICE AND WATER PURIFICATION FAUCET

FIELD OF THE DISCLOSURE

The present disclosure relates to a waterway transferring device and a water purification faucet.

BACKGROUND OF THE DISCLOSURE

In recent years, more and more users use a water purifier in their homes, and most of the users mount the water purifier independently, so that the number of pipelines is increased, and the water purifier is difficult to arrange when the users mount the water purifier. There exists in the prior art techniques for making a purified water pipeline and a water supply line be integrated, and the integrated structure in the prior art makes the purified water pipeline and the water supply line converge on and flow to a double-layer tube body through a water transferring head. The double-layer tube body is connected on a double-layer joint of the water transferring head. The double-layer joint comprises an outer joint and an inner joint, and the outer joint bears water pressure of the water supply line. Water pressure of the integrated structure is great, and the double-layer joint easily releases due to the water pressure.

BRIEF SUMMARY OF THE DISCLOSURE

The present disclosure provides a waterway transferring device and a water purification faucet that can prevent a water outlet joint from releasing to solve the deficiencies in the background.

In order to solve the technical problem, a first technical solution of the present disclosure is as follows.

A waterway transferring device comprises a transferring body, a water outlet joint, and an anti-releasing mechanism. The transferring body comprises a first water inlet passage, a second water inlet passage, and a water outlet passage, and the first water inlet passage and the second water inlet passage are respectively connected to the water outlet passage. The water outlet joint comprises an outer joint and an inner joint. The inner joint extends in the outer joint. The inner joint is configured to be connected to the first water inlet passage, and the outer joint is configured to be rotated to be connected to the water outlet passage and in communication with the second water inlet passage. The first water inlet passage, the water outlet joint, and the water outlet passage are coaxially arranged. The anti-releasing mechanism comprises a first anti-releasing member and a second anti-releasing member. The first anti-releasing member is disposed on one of the transferring body or the water outlet joint, and the second anti-releasing member is disposed on the other one of the transferring body or the water outlet joint. When the outer joint is rotated to be connected to the water outlet passage, the first anti-releasing member and the second anti-releasing member are rotated relative to each other to be connected together. When the outer joint is rotated reversely, the first anti-releasing member and the second anti-releasing member abut each other in an opposite direction to inhibit a rotation of the outer joint.

In a preferred embodiment, the first anti-releasing member comprises a plurality of protrusions. The second anti-releasing member comprises a plurality of grooves. The plurality of protrusions and the plurality of grooves are respectively arranged along a circumferential direction of the outer joint at intervals. When the outer joint is rotated to be connected to the water outlet passage, the plurality of protrusions are rotated relative to the plurality of grooves and are disposed in the plurality of grooves. When the outer joint is rotated reversely, a side wall of each of the plurality of grooves abuts each of the plurality of protrusions to inhibit the rotation of the outer joint.

In a preferred embodiment, the plurality of protrusions extend for a distance along a rotation direction of the outer joint. An extending distal end of each of the plurality of protrusions comprises a position-limiting wall. The side wall of each of the plurality of grooves is configured to abut the position-limiting wall.

In a preferred embodiment, the plurality of protrusions are configured to move along the rotation direction of the outer joint and move into the plurality of grooves.

In a preferred embodiment, the plurality of protrusions are spaced apart from each other at an inlet of the water outlet passage, on an inner peripheral wall of the water outlet passage, or on a bottom wall of the water outlet passage. The plurality of grooves are spaced from each other on the outer joint.

In a preferred embodiment, the second water inlet passage is adjacent to the first water inlet passage, and the second water inlet passage extends relative to the first water inlet passage at an angle.

In a preferred embodiment, the angle between the first water inlet passage and the second water inlet passage is 30 degrees.

In a preferred embodiment, the waterway transferring device comprises two water inlet joints, and the two water inlet joints are respectively connected to the first water inlet passage and the second water inlet passage.

A second technical solution of the present disclosure is as follows.

A water purification faucet comprises the waterway transferring device.

The first water inlet passage is configured to receive purified water, and the second water inlet passage is configured to receive mixed water.

In a preferred embodiment, the water purification faucet further comprises a double-layer tube body. A first end of the double-layer tube body is connected to the water outlet joint, and a second end of the double-layer tube body is connected to a water outlet terminal of the water purification faucet.

Compared with the existing techniques, the technical solution has the following advantages.

1. When the outer joint is rotated to be connected to the water outlet passage, the first anti-releasing member and the second anti-releasing member are rotated relative to each other to be connected together, and when the outer joint is rotated reversely, the first anti-releasing member and the second anti-releasing member abut each other in an opposite direction to inhibit a rotation of the outer joint. The water outlet joint is prevented from falling off when in use.

2. The second water inlet passage extends relative to the first water inlet passage at an angle, so that the pipelines connected to the first inlet passage and the second inlet passage are prevented from being wound.

DETAILED DESCRIPTION OF THE EMBODIMENTS

Figure 1:
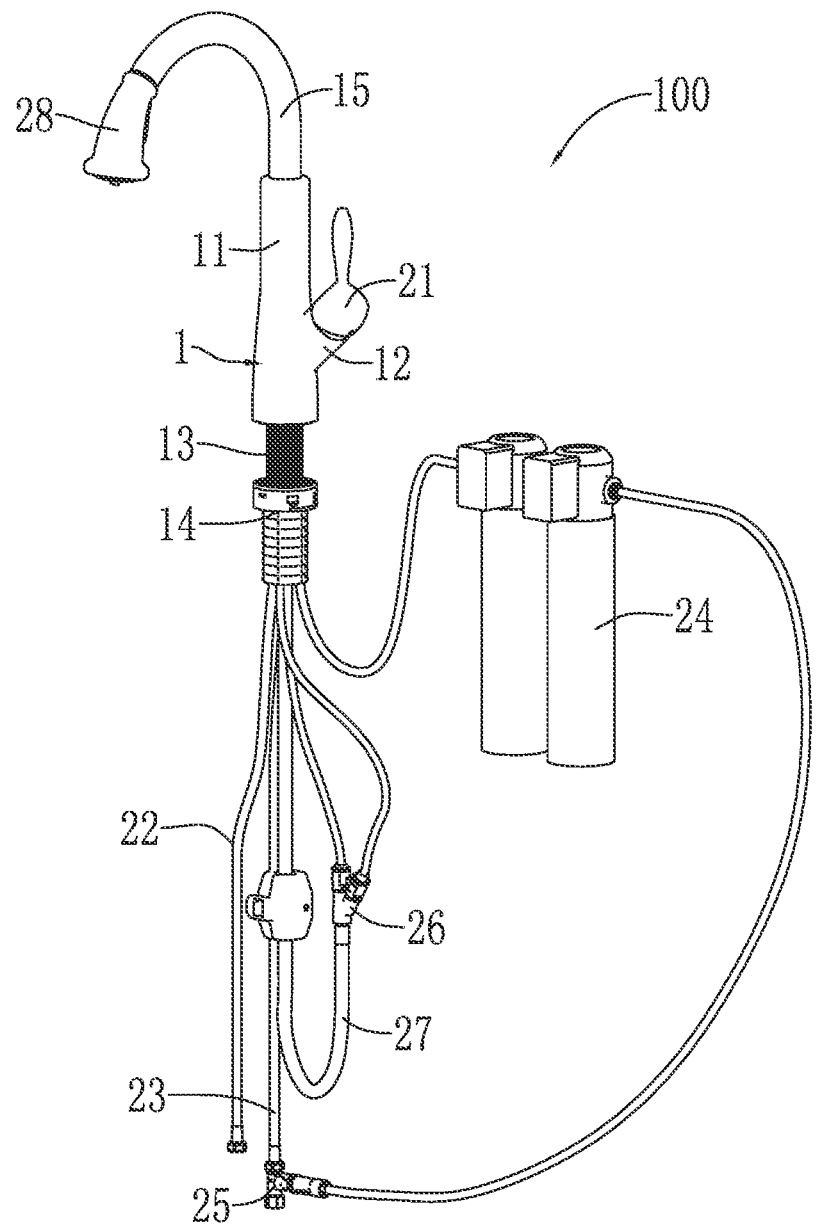
FIG. 1 illustrates a perspective view of a water purification faucet in the present disclosure.
Figure 2:
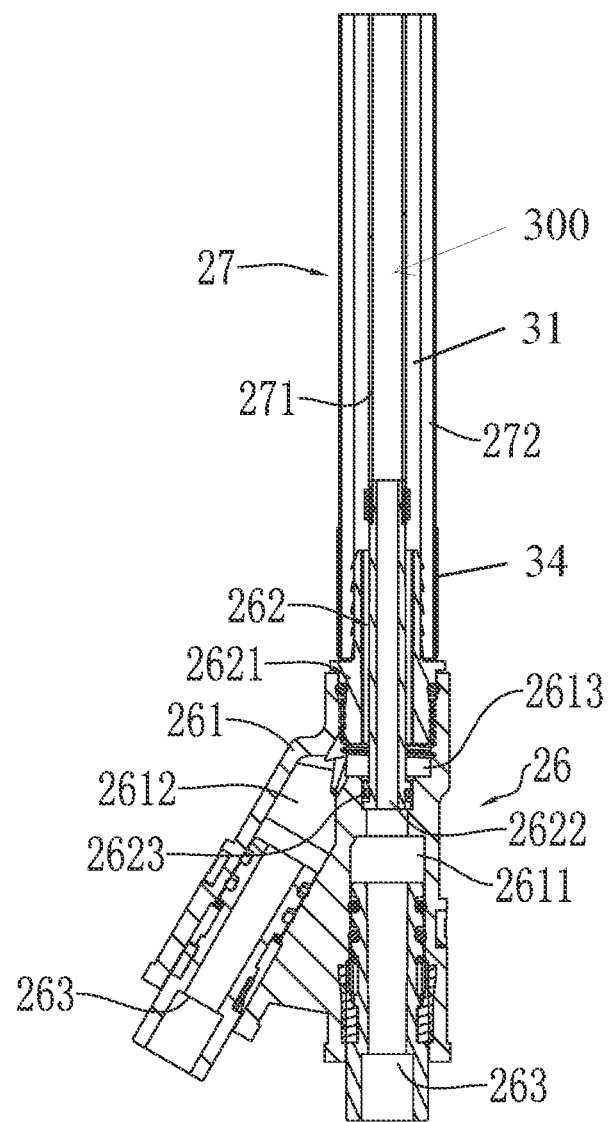
FIG. 2 illustrates a cross-sectional view of a water transferring device and a double-layer tube body of a first embodiment in the present disclosure.
Figure 3:
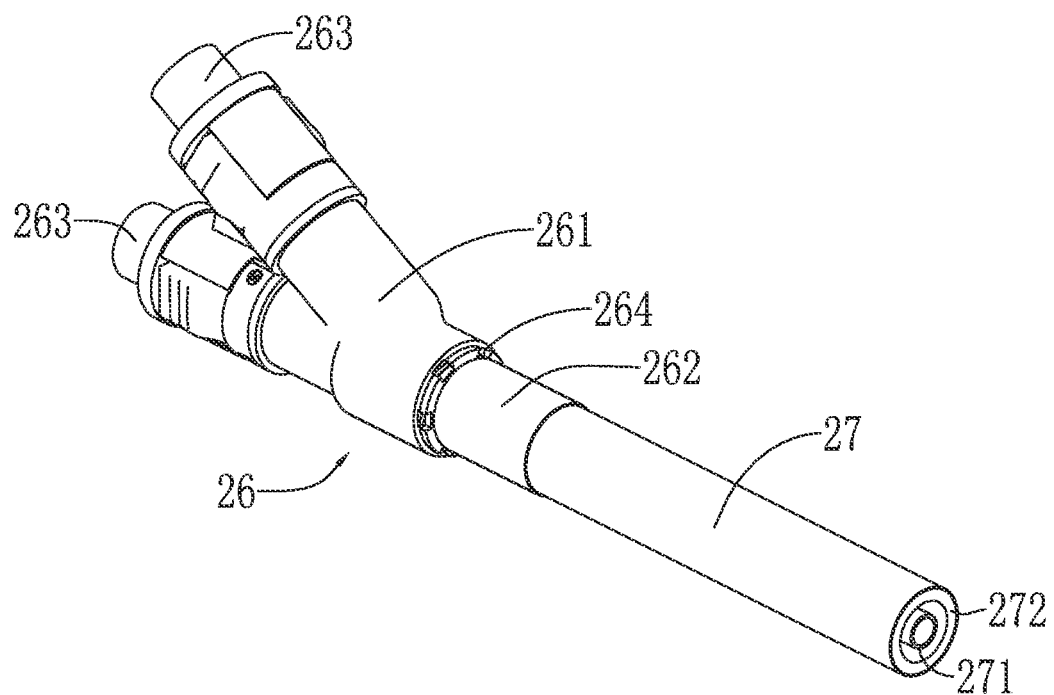
FIG. 3 illustrates a perspective view of the water transferring device and the double-layer tube body of the first embodiment in the present disclosure.
Figure 4:
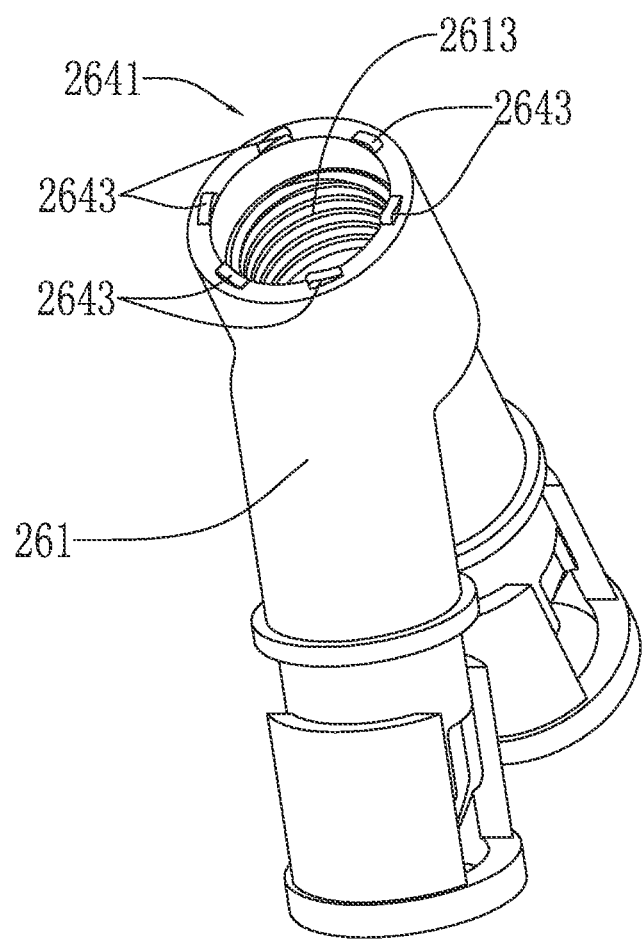
FIG. 4 illustrates a perspective view of a transferring body of the first embodiment in the present disclosure.
Figure 5:
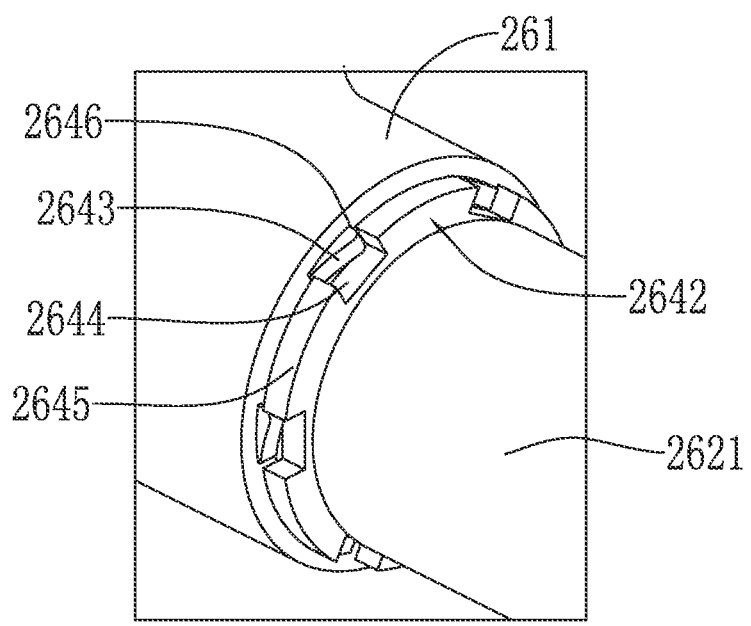
FIG. 5 illustrates a partial perspective view of the water transferring device of the first embodiment in the present disclosure.

The present disclosure will be further described below in combination with the accompanying drawings and embodiments.

Some directional terms used to describe the drawings, such as "inner", "outer", "above", "below", and other directional terms will be understood to have their normal meaning and refer to those directions involved in normal viewing of the drawings. Unless otherwise indicated, directional terms described herein substantially follow conventional directions as understood by those skilled in the art.

The terms "first", "second", and similar terms used in the present disclosure do not denote any order, quantity, or importance in the present disclosure, but are used to distinguish one component from other components.

Referring to FIGS. 1-9, a water purification faucet 100 is provided. The water purification faucet 100 comprises a faucet body 1, and the faucet body 1 comprises a vertical pipe 11 and a horizontal pipe 12. The horizontal pipe 12 is connected to the vertical pipe 11. A first end of the vertical pipe 11 is connected with a threaded pipe 13, and the threaded pipe 13 is screwed with a fixing base 14. The threaded pipe 13 is used for passing through a countertop. The vertical pipe 11 is pressed on an upper surface of the countertop, and the fixing base 14 is screwed on the threaded pipe 13 and pressed on a lower surface of the countertop. A second end of the vertical pipe 11 is connected with a water outlet pipe body 15, and the water outlet pipe body 15 is arched upwards. The water purification faucet 100 further comprises a valve assembly 21, and the valve assembly 21 is disposed in the horizontal pipe 12. The valve assembly 21 comprises a valve having a function of three inlets and two outlets. Specifically, the valve has the three inlets and the two outlets, a first inlet and a second inlet of the three inlets respectively receive hot water and cold water, and a third inlet of the three inlets receives purified water. The valve receives the hot water and the cold water to form mixed water that is output at a first outlet of the two outlets. The valve receives the purified water that is output at a second outlet of the two outlets. The valve can control at least one of the two outlets to be opened.

The water purification faucet 100 further comprises a hot water inlet pipe 22 and a cold water inlet pipe 23. The hot water inlet pipe 22 receives the hot water, and the cold water inlet pipe 23 receives the cold water. The hot water inlet pipe 22 and the cold water inlet pipe 23 are respectively in communication with the first inlet and the second inlet of the three inlets of the valve.

The water purification faucet 100 comprises a water purifier 24, and the water purification faucet 100 further comprises a three-way pipe 25 disposed at a water inlet port of the cold water inlet pipe 23. A first end of the three-way pipe 25 receives the cold water, and a second end of the three-way pipe 25 is in communication with the second inlet of the three inlets through the cold water inlet pipe 23. A third end of the three-way pipe is in communication with the water purifier 24 through a first pipeline. The water purifier 24 purifies the cold water to form the purified water, and the purified water is provided to the third inlet of the three inlets through a second pipeline.

The water purification faucet 100 further comprises a waterway transferring device 26, and the waterway transferring device 26 comprises a transferring body 261, a water outlet joint 262, and two water inlet joints 263. The transferring body 261 comprises a first water inlet passage 2611, a second water inlet passage 2612, and a water outlet passage 2613, and the first water inlet passage 2611 and the second water inlet passage 2612 are respectively connected to the water outlet passage 2613. The two water inlet joints 263 are respectively connected to the first water inlet passage 2611 and the second water inlet passage 2612. Through a third pipeline, the first water inlet passage 2611 is connected to the second outlet of the two outlets through which the purified water is output, and through a fourth pipeline, the second water inlet passage 2612 is connected to the first outlet of the two outlet through which the mixed water is output.

The water outlet joint 262 is connected to the water outlet passage 2613. The water outlet joint 262 comprises an outer joint 2621 and an inner joint 2622, and the inner joint 2622 extends in the outer joint 2621. The inner joint 2622 is connected to the first water inlet passage 2611, and the inner joint 2622 is sleeved with a sealing ring 2623. The sealing ring 2623 is sealingly connected between the inner joint 2622 and an inner peripheral wall of the first water inlet passage 2611. The outer joint 2621 is rotated to be connected to the water outlet passage 2613 and is in communication with the second water inlet passage 2612. The first water inlet passage 2611, the water outlet joint 262, and the water outlet passage 2613 are coaxially arranged. The water purification faucet 100 further comprises a double-layer tube body 27. A first end of the double-layer tube body 27 is connected to the water outlet joint 262, and a second end of the double-layer tube body 27 is connected to a water outlet terminal of the water purification faucet 100. Specifically, the double-layer tube body 27 comprises an inner layer tube 271 and an outer layer tube 272. The inner layer tube 271 is connected to the inner joint 2622, and the outer layer tube 272 is connected to the outer joint 2621. The double-layer tube body 27 successively extends through the threaded pipe 13, the vertical pipe 11, and the water outlet pipe body 15 from bottom to top to be connected with a water shower 28. The water shower 28 can be pulled by a user to be separated from the water outlet pipe body 15, and the water shower 28 comprises a purified water outlet and a mixed water outlet. The purified water outlet is connected to the inner layer tube 271, and the mixed water outlet is connected to the outer layer tube 272. The water shower 28 defines the water outlet terminal of the water purification faucet 100.

The water purification faucet 100 further comprises a tube-in-tube structure 300, and the tube-in-tube structure 300 comprises the double-layer tube body 27 and the water outlet joint 262. One end of the double-layer tube body 27 is connected with the water outlet joint 262. A water passage 31 is defined between the outer layer tube 272 and the inner layer tube 271, and the water passage 31 is in communication with the outer joint 2621. An inner end of the inner joint 2622 is sealingly disposed in an end of the inner layer tube 271. Specifically, the inner end of the inner joint 2622 is tightly inserted into the end of the inner layer tube 271. An outer end of the inner joint 2622 is sleeved with the sealing ring 2623 sealingly connected between the outer end of the inner joint 2622 and an inner peripheral wall of the first water inlet passage 2611, and the outer end of the inner joint 2622 comprises an annular groove 32 for receiving the sealing ring 2623. An outer peripheral wall of the outer joint 2621 is sleeved with the outer layer tube 272.

An inner side of the outer peripheral wall of the outer joint 2621 comprises at least one positioning ring 33 for preventing the outer layer tube 272 from being released, and the outer layer tube 272 is sleeved on the inner side of the outer peripheral wall of the outer joint 2621. The at least one positioning ring 33 comprises an inclined surface 331 facing the outer layer tube 272. The inclined surface 331 defines a reverse hook. When the inner side of the outer peripheral wall of the outer joint 2621 is inserted into the outer layer tube 272, an inner peripheral wall of the outer layer tube 272 slides on the inclined surface 331. When the outer joint 2621 is being pulled, the reverse hook is fixedly hooked on the inner peripheral wall of the outer layer tube 272 to prevent the outer layer tube 272 from being released.

An outer side of the outer layer tube 272 is disposed with a pressing sleeve 34 configured for applying a pressure onto the outer layer tube 272 to enable the outer layer tube 272 to be fixedly connected to the at least one positioning ring 33. In this embodiment, the pressing sleeve 34 is made of metal.

An outer side of the outer peripheral wall of the outer joint 2621 comprises external threads 35 for connection to the transferring body 261.

The second water inlet passage 2612 is adjacent to the first water inlet passage 2611, and the second water inlet passage 2612 extends relative to the first water inlet passage 2611 at an angle. Specifically, an included angle between the first water inlet passage 2611 and the second water inlet passage 2612 is 30 degrees, which can prevent the two pipelines from winding.

The waterway transferring device 26 further comprises an anti-releasing mechanism 264, and the anti-releasing mechanism 264 comprises a first anti-releasing member 2641 and a second anti-releasing member 2642. The first anti-releasing member 2641 is disposed on one of the transferring body 261 or the water outlet joint 262, and the second anti-releasing member 2642 is disposed on the other one of the transferring body 261 or the water outlet joint 262. When the outer joint 2621 is rotated to be connected to the water outlet passage 2613, the first anti-releasing member 2641 and the second anti-releasing member 2642 are rotated relative to each other before connection to each other. When the outer joint 2621 is reversely rotated, the first anti-releasing member 2641 and the second anti-releasing member 2642 abut each other to inhibit a rotation of the outer joint 2621. The anti-releasing mechanism 264 enables the outer joint 2621 to be only rotated to be connected to the water outlet passage 2613, and when the anti-releasing mechanism 264 receives a moment of reverse rotation, the first anti-releasing member 2641 and the second anti-releasing member 2642 abut each other in an opposite direction to inhibit the rotation of the outer joint 2621. Specifically, the outer joint 2621 is screwed to the water outlet passage 2613, and the outer joint 2621 may be connected by way of a guide block and a spiral guide rail, but the disclosure is not limited thereto.

The first anti-releasing member 2641 comprises a plurality of protrusions 2643, and the second anti-releasing member 2642 comprises a plurality of grooves 2644. The plurality of protrusions 2643 and the plurality of grooves 2644 are respectively arranged along a circumferential direction of the outer joint 2621 at intervals. When the outer joint 2621 is rotated to be connected to the water outlet passage 2613, the plurality of protrusions 2643 are rotated relative to the plurality of grooves 2644 and are inserted into the plurality of grooves 2644. When the outer joint 2621 is rotated reversely, a side wall of each of the plurality of grooves 2644 abuts each of the plurality of protrusions 2643 to inhibit the rotation of the outer joint 2621. The plurality of protrusions 2643 extend for a distance along a rotation direction of the outer joint 2621, and an extending distal end of each of the plurality of protrusions 2643 comprises a position-limiting wall 2646. The side wall of each of the plurality of grooves 2644 abuts the position-limiting wall 2646, and the plurality of protrusions 2643 move along the rotation direction of the outer joint 2621 and gradually move into the plurality of grooves 2644.

Specifically, each of the plurality of protrusions 2643 is substantially in a shape of a right triangle. One of two straight sides of the right triangle is configured to be connected to the outer joint 2621, the other one of the two straight sides of the right triangle defines the position-limiting wall 2646, and an oblique side of the right triangle indicates the extending direction of the plurality of protrusions 2643. When the outer joint 2621 is rotated to be connected to the water outlet passage 2613, an edge of the side wall of each of the plurality of grooves 2644 abuts and slides on the oblique side until the plurality of protrusions 2643 completely move into the plurality of grooves 2644. When the outer joint 2621 is rotated reversely, the side wall of each of the plurality of grooves 2644 abuts the position-limiting wall 2646. At this time, because there is no oblique side, the side wall of each of the plurality of grooves 2644 always abuts the position-limiting wall 2646, and the outer joint 2621 is inhibited from rotating.

Figure 6:
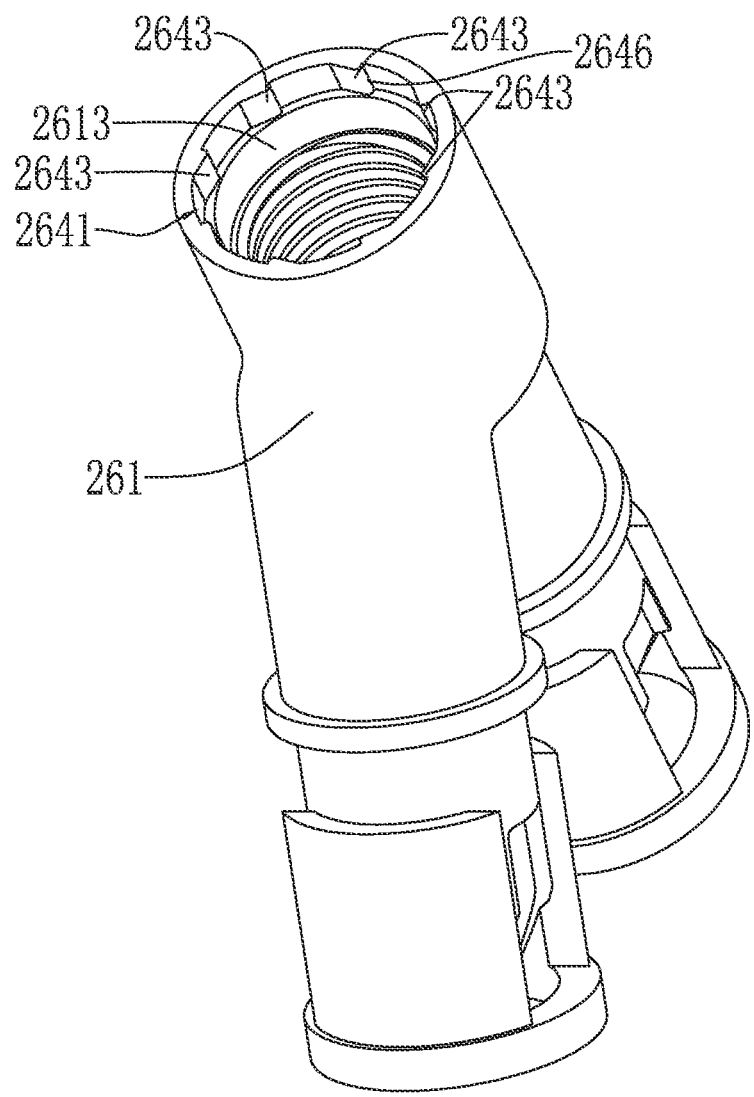
FIG. 6 illustrates a perspective view of a transferring body of a second embodiment in the present disclosure.
Figure 7:
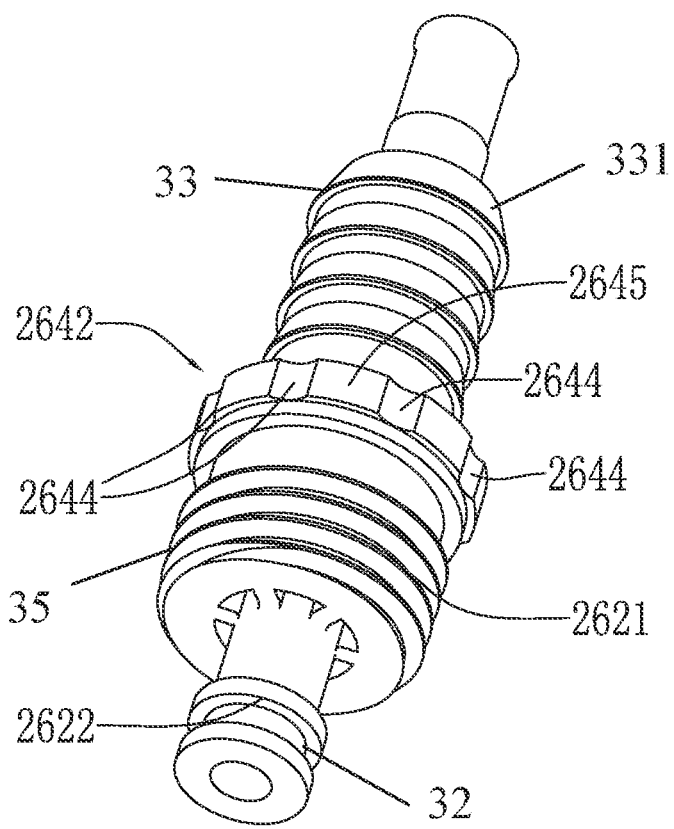
FIG. 7 illustrates a perspective view of a water outlet joint of the second embodiment in the present disclosure.
Figure 8:
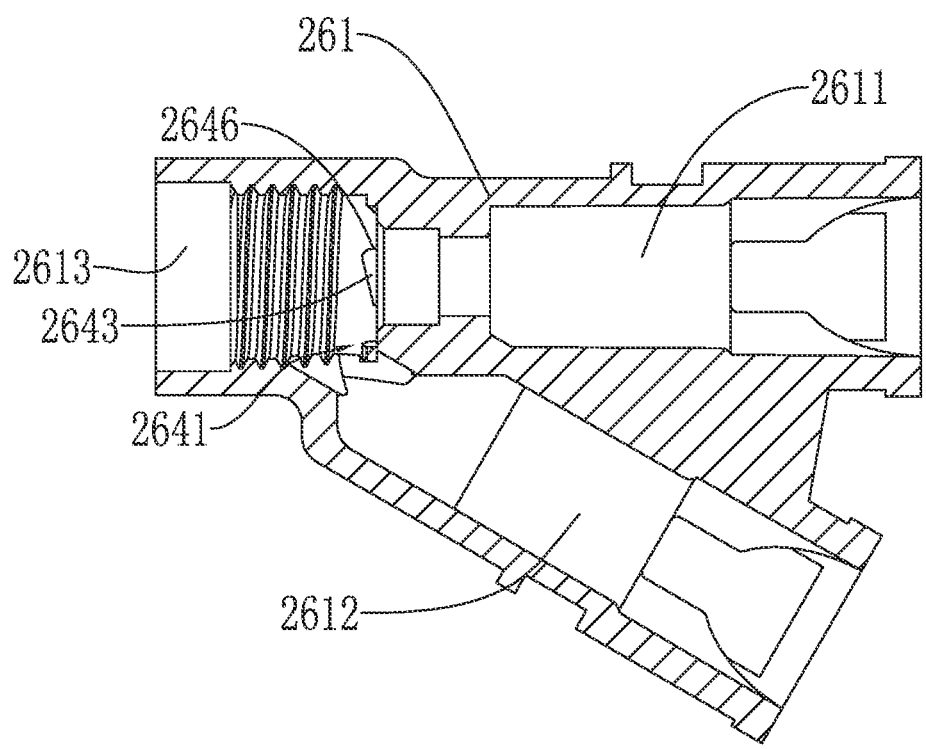
FIG. 8 illustrates a cross-sectional view of a transferring body of a third embodiment in the present disclosure.
Figure 9:
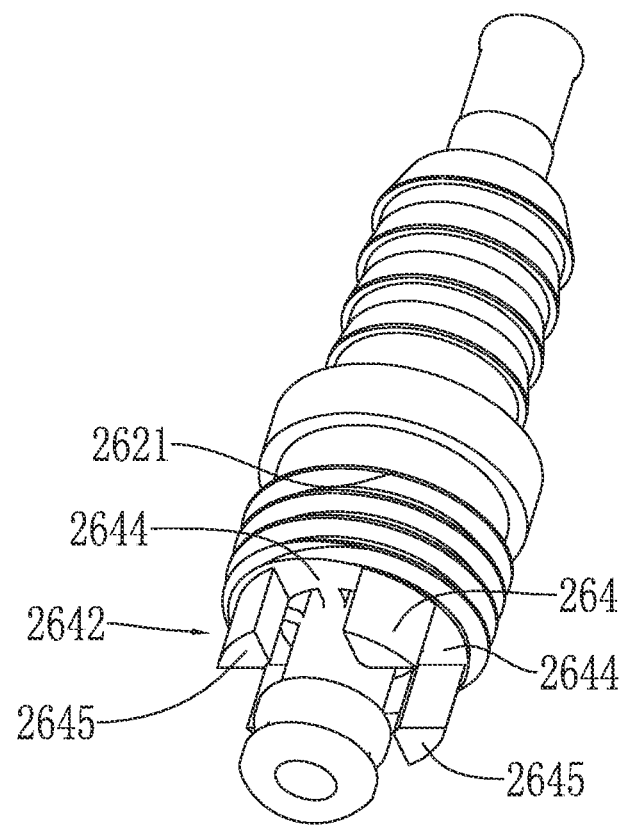
FIG. 9 illustrates a perspective view of a water outlet joint of the third embodiment in the present disclosure.

Referring to FIG. 2-5, a first embodiment of the anti-releasing mechanism 264 is shown. In this embodiment, the plurality of protrusions 2643 are spaced apart from each other at an inlet of the water outlet passage 2613. An outer peripheral wall of the outer joint 2621 comprises a plurality of protruding blocks 2645 spaced apart from each other, and each of the plurality of grooves 2644 are defined between two adjacent protruding blocks 2645 of the plurality of protruding blocks 2645. Referring to FIGS. 6-7, a second embodiment of the anti-releasing mechanism 264 is shown. In this embodiment, the plurality of protrusions 2643 are spaced apart from each other on an inner peripheral wall of the water outlet passage 2613. The outer peripheral wall of the outer joint 2621 comprises a plurality of protruding blocks 2645 spaced apart from each other, and the plurality of grooves 2644 are defined between two adjacent protruding blocks 2645 of the plurality of protruding blocks 2645. Referring to FIGS. 8-9, a third embodiment of the anti-releasing mechanism 264 is shown. In this embodiment, the plurality of protrusions 2643 are spaced apart from each other on a bottom wall of the water outlet passage 2613. One end of the outer joint 2621 facing the plurality of protrusions 2643 comprises a plurality of protruding blocks 2645 spaced apart from each other, and the plurality of grooves 2644 are defined between two adjacent protruding blocks 2645 of the plurality of protruding blocks 2645.

In a process of using the water purification faucet 100, when the mixed water needs to be discharged, the user controls the valve to discharge the mixed water through the valve assembly 21, the mixed water is provided to the second water inlet passage 2612 through a pipeline, then the mixed water flows into the water outlet passage 2613, and then the mixed water flows into the outer layer tube 272 from the water outlet passage 2613. The water pressure of the mixed water causes the outer joint 2621 to have a tendency to rotate and fall off. In addition, when the user grasps the water shower 28 and draws the water shower 28 out from the water outlet pipe body 15, the water outlet joint 262 also has a tendency to rotate and fall off under a pulling action of the double-layer tube body 27. The side wall of each of the plurality of grooves 2644 abuts the position-limiting wall 2646 and prevents the outer joint 2621 from rotating and falling off. The mixed water flows into the water shower 28 through the outer layer tube 272 and flows out from the mixed water outlet.

When the purified water needs to be discharged, the user controls the valve to discharge the purified water through the valve assembly 21, the purified water is provided to the first water inlet passage 2611 through a pipeline, then the purified water flows into the inner joint 2622 and flows into the inner layer tube 271, and the purified water flows into the water shower 28 through the inner layer tube 271 and flows out from the purified water outlet.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A waterway transferring device, comprising:
   a transferring body,
   a water outlet joint, and
   an anti-releasing mechanism, wherein:
      the transferring body comprises a first water inlet passage, a second water inlet passage, and a water outlet passage,
      the first water inlet passage and the second water inlet passage are respectively connected to the water outlet passage,
      the water outlet joint comprises an outer joint and an inner joint,
      the inner joint extends in the outer joint,
      the inner joint is configured to be connected to the first water inlet passage,
      the outer joint is configured to be rotated to be connected to the water outlet passage and in communication with the second water inlet passage,
      the first water inlet passage, the water outlet joint, and the water outlet passage are coaxially arranged,
      the second water inlet passage extends relative to the first water inlet passage at an acute angle,
      the anti-releasing mechanism comprises a first anti-releasing member and a second anti-releasing member,
      the first anti-releasing member is disposed on the transferring body,
      the second anti-releasing member is disposed on the water outlet joint,
      the first anti-releasing member comprises a plurality of protrusions,
      the second anti-releasing member comprises a plurality of grooves,
      two opposite sides of each of the plurality of protrusions are:
         an oblique side with a height increasing along a direction in which the water outlet joint rotates, and
         a straight side to prevent the water outlet joint rotating and disconnecting from the water outlet passage due to water flowing from the second water inlet passage,
      the first water inlet passage is connected to a first outlet through which purified water is output,
      the second water inlet passage is connected to a second outlet through which mixed water is output,
      when the outer joint is rotated to be connected to the water outlet passage, the first anti-releasing member and the second anti-releasing member are rotated relative to each other to be connected together, and
      when the outer joint is rotated reversely, the first anti-releasing member and the second anti-releasing member abut each other in an opposite direction to inhibit a rotation of the outer joint.

2. The waterway transferring device according to claim 1, wherein:
   the plurality of protrusions and the plurality of grooves are respectively arranged along a circumferential direction of the outer joint at intervals,
   when the outer joint is rotated to be connected to the water outlet passage, the plurality of protrusions are rotated relative to the plurality of grooves and are disposed in the plurality of grooves, and
   when the outer joint is rotated reversely, a side wall of each of the plurality of grooves abuts each of the plurality of protrusions to inhibit the rotation of the outer joint.

3. The waterway transferring device according to claim 2, wherein:
   the plurality of protrusions extend for a distance along a rotation direction of the outer joint,
   the straight side defines a position-limiting wall, and
   the side wall of each of the plurality of grooves is configured to abut the position-limiting wall.

4. The waterway transferring device according to claim 3, wherein:
   the plurality of protrusions are configured to move along the rotation direction of the outer joint and move into the plurality of grooves.

5. The waterway transferring device according to claim 1, wherein:
   the plurality of protrusions are spaced apart from each other on an inner peripheral wall of the water outlet passage, and
   the plurality of grooves are spaced from each other on the outer joint.

6. The waterway transferring device according to claim 1, wherein:
   the second water inlet passage is adjacent to the first water inlet passage.

7. The waterway transferring device according to claim 1, wherein:
   the acute angle between the first water inlet passage and the second water inlet passage is 30 degrees.

8. The waterway transferring device according to claim 1, wherein:
   the waterway transferring device comprises two water inlet joints, and the two water inlet joints are respectively connected to the first water inlet passage and the second water inlet passage.

9. A water purification faucet, comprising:
the waterway transferring device according to claim 1.

10. The water purification faucet according to claim 9, wherein:
the water purification faucet further comprises a double-layer tube body,
a first end of the double-layer tube body is connected to the water outlet joint, and
a second end of the double-layer tube body is connected to a water outlet terminal of the water purification faucet.

11. The water purification faucet according to claim 9, wherein:
the water purification faucet further comprises a tube-in-tube structure,
the tube-in-tube structure comprises a double-layer tube body and the water outlet joint,
one end of the double-layer tube body is connected with the water outlet joint,
the double-layer tube body comprises an outer layer tube and an inner layer tube extending in the outer layer tube,
a water passage is defined between the outer layer tube and the inner layer tube,
an inner end of the inner joint is sealingly disposed in an end of the inner layer tube,
an outer end of the inner joint is sleeved with a sealing ring sealingly connected between the outer end of the inner joint and an inner peripheral wall of the first water inlet passage, and
an outer peripheral wall of the outer joint is sleeved with the outer layer tube.

12. The water purification faucet according to claim 11, wherein:
an inner side of the outer peripheral wall of the outer joint comprises at least one positioning ring for preventing the outer layer tube from being released, and
the at least one positioning ring comprises an inclined surface facing the outer layer tube.

13. The water purification faucet according to claim 12, wherein:
an outer side of the outer layer tube is disposed with a pressing sleeve configured for applying a pressure onto the outer layer tube to enable the outer layer tube to be fixedly connected to the at least one positioning ring.

14. The water purification faucet according to claim 11, wherein:
an outer side of the outer peripheral wall of the outer joint comprises external threads.

15. The waterway transferring device according to claim 1, wherein:
the plurality of protrusions are spaced apart from each other at an inlet of the water outlet passage or on a bottom wall of the water outlet passage, and
the plurality of grooves are spaced from each other on the outer joint.

16. The waterway transferring device according to claim 1, wherein:
the plurality of grooves are evenly disposed, and
a shape of each of the plurality of grooves is left-right symmetric in a rotation direction of the outer joint.

\* \* \* \* \*